(12) United States Patent
Kurylo et al.

(10) Patent No.: US 9,449,594 B2
(45) Date of Patent: Sep. 20, 2016

(54) ADAPTIVE PHASE DIFFERENCE BASED NOISE REDUCTION FOR AUTOMATIC SPEECH RECOGNITION (ASR)

(71) Applicant: Intel Corporation, Santa Clara, CA (US)

(72) Inventors: Lukasz Kurylo, Gdansk (PL); Georg Stemmer, München (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/124,790

(22) PCT Filed: Sep. 17, 2013

(86) PCT No.: PCT/PL2013/050022
§ 371 (c)(1),
(2) Date: Dec. 9, 2013

(87) PCT Pub. No.: WO2015/041549
PCT Pub. Date: Mar. 26, 2015

(65) Prior Publication Data
US 2015/0078571 A1    Mar. 19, 2015

(51) Int. Cl.
*G10K 11/178*    (2006.01)
*H04R 3/00*     (2006.01)
*G10L 21/0232*  (2013.01)
(Continued)

(52) U.S. Cl.
CPC ......... *G10K 11/178* (2013.01); *G10L 21/0232* (2013.01); *H04M 3/568* (2013.01); *H04R 3/005* (2013.01); *G10L 2021/02087* (2013.01); *G10L 2021/02166* (2013.01)

(58) Field of Classification Search
USPC ............ 381/60, 92; 382/118; 375/346, 330; 455/205
See application file for complete search history.

(56) References Cited

U.S. PATENT DOCUMENTS 6,069,924 A  * 5/2000 Sudo .................. H04L 27/2332
                                              375/330
8,077,815 B1   12/2011 Johnston
(Continued)

FOREIGN PATENT DOCUMENTS

EP         2551849 A1    1/2013

OTHER PUBLICATIONS

Seon Man Kim ("Probabilistic spectral gain modification applied to beamformer-based noise reduction in a car environment", IEEE Transactions on Consumer Electronics, vol. 57, No. 2, May 2011, pp. 866-872).*

(Continued)

*Primary Examiner* — MD S Elahee
(74) *Attorney, Agent, or Firm* — Schwegman Lundberg & Woessner, P.A.

(57) ABSTRACT

Embodiments of a system and method for adapting a phase difference-based noise reduction system are generally described herein. In some embodiments, spatial information associated with a first and second audio signal are determined, wherein the first and second audio signals including a target audio inside a beam and noise from outside the beam. A signal-to-noise ratio (SNR) associated with the audio signals is estimated. A mapping of phase differences to gain factors is adapted for determination of attenuation factors for attenuating frequency bins associated with noise outside the beam. Spectral subtraction is performed to remove estimated noise from the single-channel signal based on a weighting that affects frequencies associated with a target signal less. Frequency dependent attenuation factors are applied to attenuate frequency bins outside the beam to produce a target signal having noise reduced.

24 Claims, 5 Drawing Sheets

(51) Int. Cl.
*H04M 3/56* (2006.01)
*G10L 21/0208* (2013.01)
*G10L 21/0216* (2013.01)

(56) References Cited

U.S. PATENT DOCUMENTS

| | | |
|---|---|---|
| 2007/0150268 A1 | 6/2007 | Acero et al. |
| 2009/0226005 A1* | 9/2009 | Acero ............... G10L 21/0208 381/92 |
| 2010/0159861 A1* | 6/2010 | Becker ............... H04L 7/0029 455/205 |
| 2011/0038489 A1 | 2/2011 | Visser et al. |

OTHER PUBLICATIONS

"International Application Serial No. PCT/PL2013/050022, International Search Report mailed Dec. 23, 2013", 3 pgs.

"International Application Serial No. PCT/PL2013/050022, Written Opinion mailed Dec. 23, 2013", 5 pgs.

Seon, Man Kim, et al., "Probabilistic spectral gain modification applied to beamformer-based noise reduction in a car environment", IEEE Transactions on Consumer Electronics, 57(2), (May 2011), 866-872.

* cited by examiner

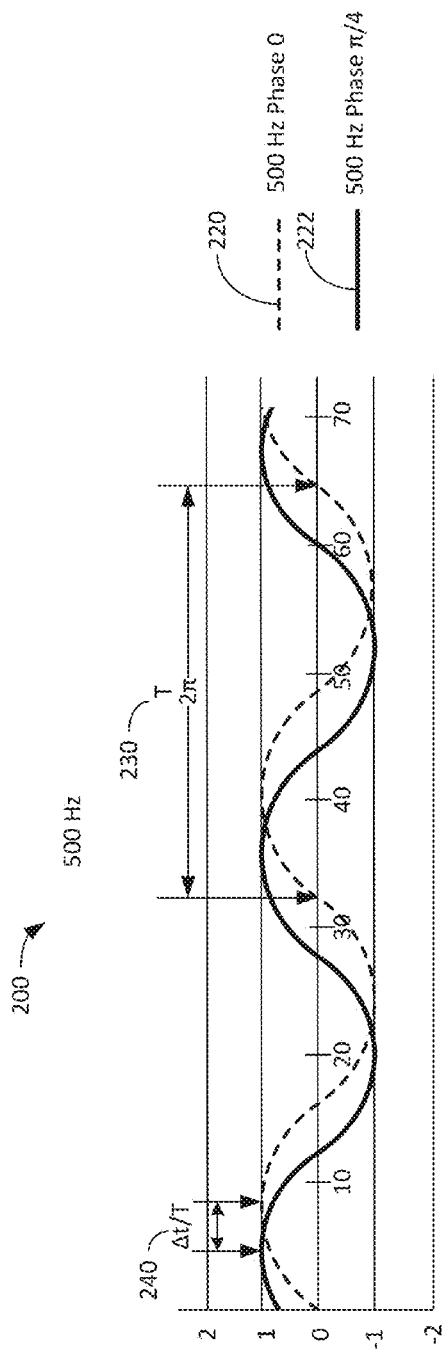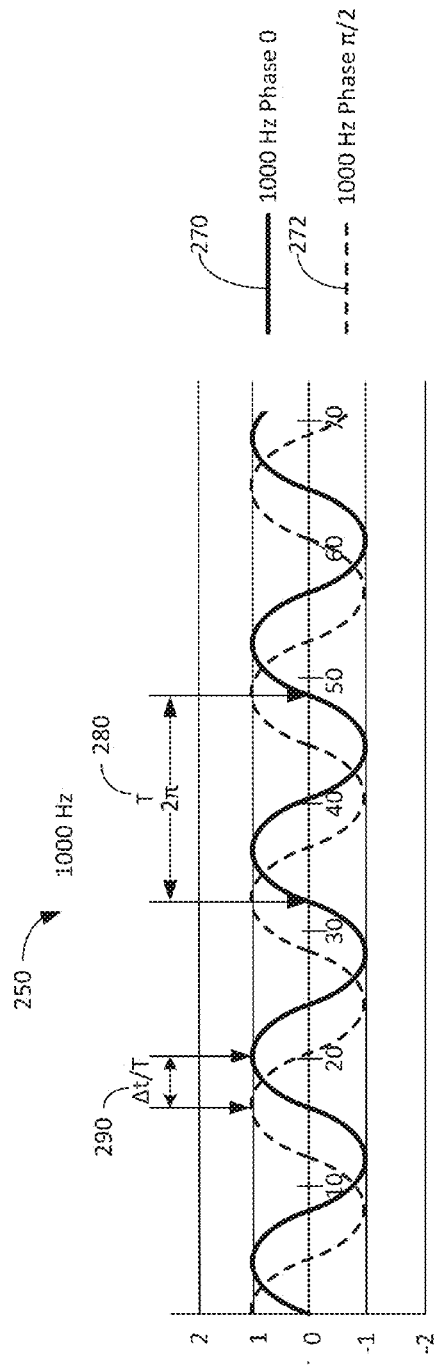

ADAPTIVE PHASE DIFFERENCE BASED NOISE REDUCTION FOR AUTOMATIC SPEECH RECOGNITION (ASR)

This application is a U.S. National Stage Filing under 35 U.S.C. 371 from International Application No. PCT/PL2013/050022, filed Sep. 17, 2013, which is incorporated herein by reference in its entirety.

BACKGROUND

In various applications such as, speech recognition and automatic teleconferencing, speech signals may be corrupted by noises which can include Gaussian noise, speech noise (unrelated conversations), and reverberation. Automatic Speech Recognition (ASR) systems are known for recognizing spoken words in audio signals. ASR technology enables microphone-equipped computing devices to interpret speech and thereby provide an alternative to human-to-computer input devices such as keyboards or keypads.

ASR accuracy degrades in noisy conditions. For instance, if there is a radio playing or people are talking in the background while the user speaks to the machine, the output of the automatic speech recognizer contains much more errors than the output derived with a silent background. In such environments, speech recognition is difficult because the signal-to-noise ratio can be insufficient. Moreover the noise model of the environment is not known and it can change depending environmental conditions, e.g., wind, music, competing background conversations, etc.

Noise reduction algorithms increase the ASR accuracy in noisy environments by processing the audio signal before it is passed to the speech recognizer. Many different noise reduction algorithms have been proposed. One algorithm used for speech enhancement is based on phase differences between the channels of a microphone array. However, this method needs to be tuned for a specific application and works well only for a limited range of noise levels and types.

Accordingly, when a speech recognizer is employed in a mobile device, such as a smartphone or laptop, speech enhancement must overcome a highly variable acoustic environment. At the same time, manual tuning of a noise reduction algorithm for each noise condition is not practical.

BRIEF DESCRIPTION OF THE DRAWINGS

FIGS. 2a-b are plots illustrating frequency dependency of the phase difference resulting from a fixed TDoA for 500 Hz and 1000 Hz according to an embodiment;

DETAILED DESCRIPTION

Embodiments of noise reduction algorithms for automatic speech recognition (ASR) systems perform phase-difference based noise reduction that is adaptive to current background noise level. Performance under highly variable noise conditions and levels is improved by using spatial information from multiple microphones to estimate the signal-to-noise ratio (SNR) and use the SNR to adapt the mapping of the phase differences to gain factors for the noise reduction filter. A frequency-dependent scaling of the phase differences and a single-channel spectral subtraction may also be used to improve embodiments of noise reduction algorithms for ASR.

Figure 1:
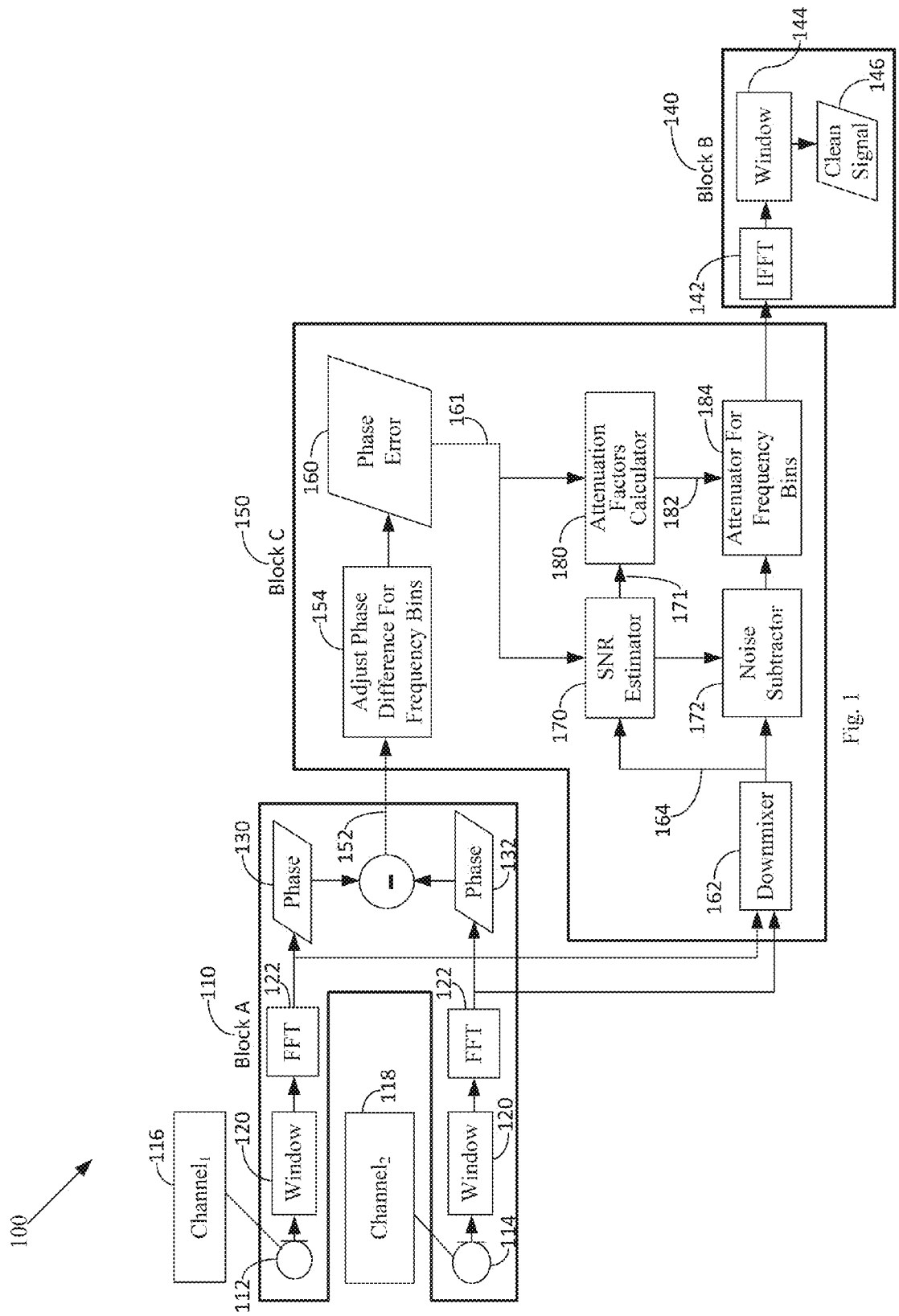
FIG. 1 illustrates an adaptive phase difference based noise reduction system according to an embodiment.

FIG. 1 illustrates an adaptive phase difference based noise reduction system 100 according to an embodiment. In FIG. 1, the signal flow and processing sequence for a microphone array having at least two microphones includes blocks A-B 110, 140 for processing blocks and Block C 150 for extensions/modifications according to an embodiment.

Both microphones 112, 114 denoted by $channel_1$ 116 and $channel_2$ 118 record signals which includes both of speech and noise. The noise can be caused for instance by a second person talking in the background or reflections from the walls. As the microphones 112, 114 are located at different positions, each of the microphones 112, 114 receives signals corresponding to different sources at slightly different times, which corresponds to different distances between each source and each microphone 112, 114. For instance, the difference in time of arrival (TDoA) may be around 0.0002 seconds or 0.2 ms, or 3 samples at a 16 kHz sampling rate for a commonly used spacing between microphones 112, 114 of, for example, 7 cm and a signal from a single source at 0° or 180° angle relative to the line connecting the microphones 112, 114.

Phase-difference-based methods utilize the fact that a different TDoA corresponds to a shift in the phase of the signals. The phase difference is known for the main speaker (from speaker position), while a secondary source like a background speaker may yield smaller or larger phase differences. Window functions 120 are being applied to input data to prepare it for transformation to frequency domain, e.g., a Hann window may be used. Then a short-time fast Fourier transform (FFT) 122 transforms the signal of each microphone 112, 114 from the time domain into the frequency domain.

The FFTs 122 produces a discrete complex frequency spectrum; i.e., real and imaginary components at discrete frequencies, or frequency bins. For both microphones 112, 114, at each frequency bin, the phase is estimated from complex spectrum, followed by the calculation of the phase difference between the channels, i.e., $channel_1$ 116 and $channel_2$ 118. The frequency bins that correspond to a phase difference that is significantly different from the one that is expected for the main speaker are attenuated. An inverse FFT 142 transforms the enhanced signal back into the time domain. Window function 144 is used to smooth transitions between processing blocks, e.g., an overlap add method may be used.

FIGS. 2a-b are plots 200, 250 illustrating frequency dependency of the phase difference resulting from a fixed TDoA for 500 Hz and 1000 Hz according to an embodiment. In FIG. 2a, the phase difference resulting from a fixed TDoA for 500 Hz 200 is shown. A signal at 500 Hz with phase 0 is shown as a dotted line 220. A signal at 500 Hz with a 45° phase shift is shown by the dark solid line 222. The period 230 for the signal at 500 Hz with phase 0 is shown by T, i.e., $2\pi$.

Similarly, in FIG. 2b, a signal at 1000 Hz with phase 0 is shown as the dark solid line 270 and a signal at 1000 Hz with a 90° phase shift is shown by the dotted line 272. The period 280 for the signal at 1000 Hz with phase 0 is shown by T, i.e., $2\pi$. Because different frequencies have different periods, T, for the same TDoA, The phase difference, (Δt/T) 240, 290, is different at 500 and 1000 Hz.

In order to calculate the phase difference error 161, for each frequency bin, an allowable phase difference, i.e., phaseThreshold, is computed upfront using beam width, microphone placement, e.g., distance, sampling frequency and a processing block length, e.g., discrete Fourier transform length. The term "beam" denotes a region where the main speaker, i.e., the source of the target speech, is located. Noise is assumed to come from regions outside the beam. Typically the beam width is fixed to around 20°. For simplicity, it is assumed in the following that the beam direction is at a 90° angle to the line that connects the microphones. Any other beam direction can easily be supported by delaying the microphone signals during downmixing and adjusting phase difference with a computed offset accordingly. In general, the higher the frequency, the allowable phase difference, (Δt/T) 240, 290, will be higher. This is contrary to some academic papers where the derived formula for the relation between SNR and phase difference is presented as being frequency independent.

Returning to FIG. 1, block C 150 shows the phase differences 152 not being used directly but rather are used to calculate phase difference errors 161 by phase difference error calculator 160 based on adjusted phase differences 154. The computation of the phase difference errors 161 is based on an observation that the phase differences 152 resulting from a fixed TDoA are frequency dependent. The phase differences 152 are provided to an adjustment module 154 that adjusts the phase differences 152 for the frequency bins.

Using the adjustments to the phase differences 152 for the frequency bins, the phase difference errors 161 are determined by the phase error calculator 160. The phase difference errors 161, as will be shown below, may be used to estimate a SNR and to calculate attenuation factors. The output of the FFTs 122 for each microphone signal is provided to a downmixer 162. The output 164 of the downmixer 162 is provided to the SNR estimator 170 and to the noise subtractor 172. The calculated attenuation factors 182 from the attenuation factor calculator 180 and the output of the noise subtractor 172 are provided to the attenuator for the frequency bins 184. Then, the IFFT 142 and window function 144 are applied to produce a clean signal 146, a signal having noise reduced according to an embodiment.

To determine the phase differences 152 out of phase detectors 130, 132, the phases for left and right channel, $Ph_L$ and $Ph_R$, are determined by calculating the inverse tangent using the imaginary components, $X_L$, and the real components, $X_R$, where $X_L$ and $X_R$ denote signals for the left and right channel, e.g., channel$_1$ 116 and channel$_2$ 118, in the frequency domain. Complex spectrum is being converted from real and imaginary components to polar representation, i.e., phases and magnitudes.

The phase differences 152 between the left and right channel, $Ph_L$ and $Ph_R$, are calculated, e.g., $Ph_L - Ph_R$. The phase differences 152 are adjusted, e.g.: 340°→20° at the phase adjustment module 154. The adjustment for a phase difference 152 greater than π is equal to −2π+ the phase difference greater than π. The adjustment for a phase difference less than −π is equal to 2π+the phase difference less than −π. The absolute values of the phase differences 152 are then calculated.

The phase difference errors 161 are equal to the absolute values of the phase differences 152 divided by the allowable phase difference for each frequency bin less one, i.e., $$\frac{|\text{phase difference}|}{\text{phase threshold}} - 1,$$

and if this value is less than zero it is changed to zero. After this operation, i.e., the measured phase differences are divided by phase threshold, the values <1 for frequency bins inside the beam and >1 for those outside are obtained. The phase differences are scaled to match the differences in time of arrival between channels for each frequency bin and to allow for differences within a defined beam when the phase difference error equals 0 inside the beam. Subtracting one from the phase threshold and clamping negative values to zero ensures that frequency bins inside the beam remain un-attenuated, i.e., the phase difference errors 161 set to 0 for those frequencies.

The following processing steps are based on a single-channel (mono) signal that is generated by the downmixer 162 out of the two input channels, i.e., channel$_1$ 116 and channel$_2$ 118. The mono signal 164 can be generated by any suitable beamforming method. The simplest possible way to implement it for a 90° beam direction is to average the input signals. In the frequency domain, the mono signal 164 from the downmixer will be denoted by $X_N$.

The current signal-to-noise-ratio (SNR) 171 is estimated and the estimated SNR 171 may be used for the noise subtractor 172 and to adapt the attenuation factors calculator 180. An example implementation for the SNR estimator 170 is based on a computation of the ratio of the energy outside of the beam, i.e., noise, and the energy inside the beam, e.g., the target information such as speech. The magnitudes for the downmixed signal, $X_N$ 164, are determined for phase difference errors 161 greater than zero, which is the magnitudes for frequency bins outside of the beam, vector outS. Instantaneous noise energy (NE) is then calculated as outS times outS transposed (dot product). The time averaged noise energy estimate for time t ($TANE_t$) is calculated as:

$$TANE_t = (1-\alpha)TANE_{t-1} + \alpha * NE$$

In a preferred embodiment α equal 1/16 has been used.

The instantaneous magnitudes of frequencies inside the beam, inS, are calculated according to:

$$inS = |X_N| \text{ for phase difference errors greater than zero.}$$

The instantaneous signal energy estimate, $SE_t$, is calculated according to:

$$SE_t = in_S * in'_S.$$

The time averaged signal energy estimate (TASE) is calculated according to:

$$TASE_t = (1-\alpha)*TASE_{t-1} + \alpha*SE_t$$

The maximum of the two signal estimates is then determined:

$$speech_E = \max[TASE_t, SE_t].$$

If the noise estimate is greater than 0, then the SNR 171 is calculated from the estimated signal and noise energies according to:

$$\text{ratio} = \frac{speech_E}{noise_E}.$$

Otherwise ratio is set to large value.

Next, the attenuation factors 182, denoted by "scale" as shown below, are computed. The attenuation factors 182 depend on a pre-defined parameter "gamma," the current SNR 171, and the phase difference error 161 for each frequency bin. Accordingly, a dynamic gamma, egamma, limited to low SNR, is computed. If the ratio of the estimated signal and noise energies is less than or equal to 1, then egamma is set to a predefined maximum value, maxEGamma A preferred embodiment uses maxEGamma equal 3. Otherwise, egamma is calculated according to:

$$egamma = gamma \cdot \frac{\text{max}EGamma}{\text{ratio}} - 0.01.$$

If egamma is less than minEGamma, then egamma is set to be equal to minEGamma A preferred embodiment uses minEGamma equal 0.001.

A scaling factor is computed for each frequency bin according to:

$$\text{scale} = \frac{1}{(1 + egamma \cdot (\text{phase difference error}^2))}.$$

The variable "scale" is used after noise subtraction to attenuate frequencies that are not inside the beam. For noise subtraction a function "ramp" is computed that ensures that the speech part of the signal, which is mostly located at lower frequencies, is less affected:

$$\text{ramp}(f) = \begin{cases} 0, & f < rampStart \\ 0.5 * -\cos\left(\pi * \frac{f - rampStart}{rampEnd - rampStart}\right) + 0.5, & \\ & rampStart < f < rampEnd \\ 1, & f > rampEnd \end{cases}.$$

A preferred embodiment uses rampStart equal 2000 Hz and rampEnd equal 6000 Hz.

The actual noise subtraction may be performed according to:

$$\text{noiser} = 1 - \frac{(\text{noise}_S * \text{ramp})}{|X_N|},$$

where $\text{noise}_S$ is the noise estimation, which may be continuously updated. If noiser is less than nMin, then noiser is set to be equal to nMin. A preferred embodiment uses nMin in the range [−1, 0] Finally, the noisy frequency bins are attenuated by multiplying the complex downmixed spectrum $X_N$ 164 with "scale" factors as described above.

Those skilled in the art will recognize that many embodiments may be implemented consistent with the above teachings. For instance, embodiments may be implemented for more than 2 microphones, may include dynamic adjustment of beam direction, etc.

Figure 3:
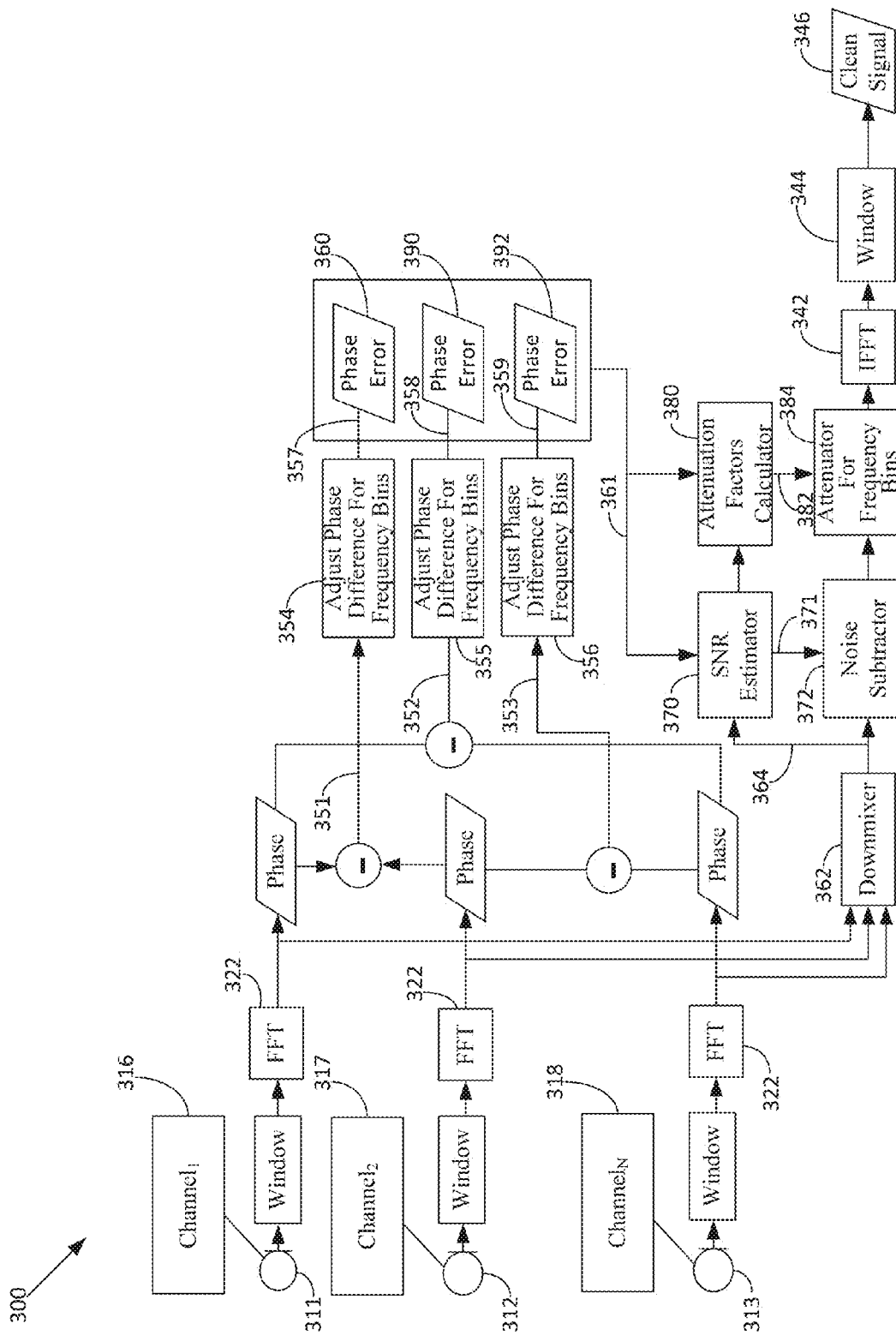
FIG. 3 illustrates phase-based spatial filtering for more than two microphones according to an embodiment.

FIG. 3 illustrates phase-based spatial filtering 300 for more than two microphones according to an embodiment. In FIG. 3, N microphones 311, 312, 313 denoted by $\text{channel}_1$ 316, $\text{channel}_2$ 317 and $\text{channel}_N$ 318, record signals which includes both of speech and noise. The noise can be caused for instance by a second person talking in the background or reflections from the walls. As the microphones are located at different positions, each of them receives signals corresponding to different sources at slightly different time, which corresponds to different distances between each source and each microphone.

In FIG. 3, the phase difference 351 between the signal from microphone 1 and the signal from microphone 2 is provided to a first phase difference adjustment module 354. The phase difference 352 between the signal from microphone 1 and the signal from microphone N is provided to a second phase difference adjustment module 355. The phase difference 353 between the signal from microphone 2 and the signal from microphone N is provided to a third phase difference adjustment module 356.

The adjustments to the phase differences for the frequency bins 357, 358, 359 are used to produce N phase difference error estimates 361 by the phase error calculators 360, 390, 392. The phase difference errors 361 are used to estimate a SNR 371 by the SNR estimator 370 and to calculate attenuation factors 382 by the attenuation factors calculator 380. The output of the N FFTs 322 for each signal from microphones 311, 312, 313 is provided to a downmixer 362. The output 364 of the downmixer 362 is provided to the SNR estimator 370 and to the noise subtractor 372. The calculated attenuation factors 382 and the output of the noise subtractor 372 are provided to the attenuator for the frequency bins 384. Then, the IFFT 342 and window function 344 are applied to produce a clean signal 346 according to an embodiment.

Figure 4:
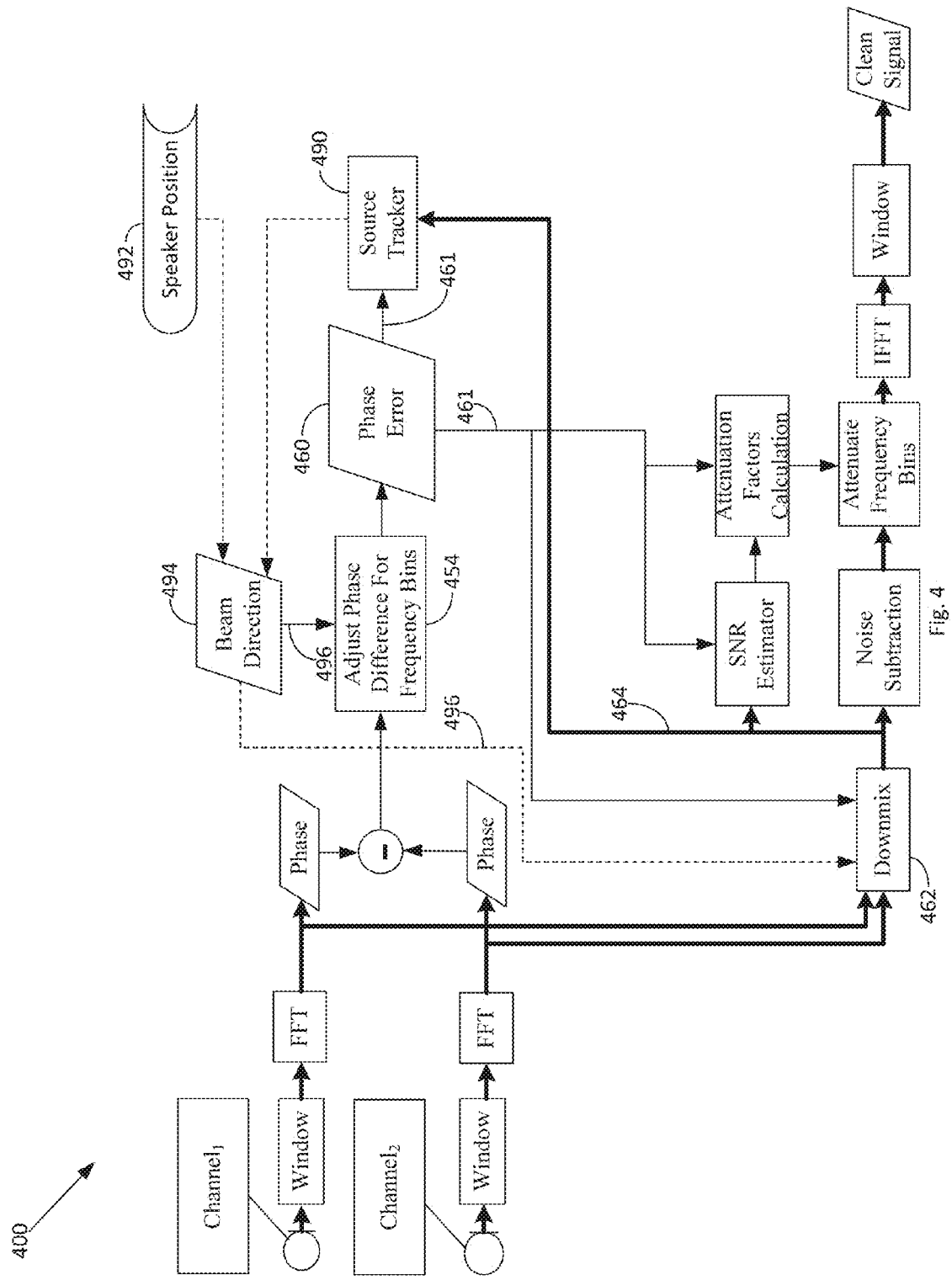
FIG. 4 illustrates phase-based spatial filtering for two microphones that uses dynamic adjustment of beam direction according to an embodiment.

FIG. 4 illustrates phase-based spatial filtering 400 for two microphones that use dynamic adjustment of beam direction according to an embodiment. The phase-based spatial filter 400 shown in FIG. 4 is similar to the phase-based spatial filter 100 shown in FIG. 1, except that a source tracker 490, speaker position input 492 are provided to a beam direction determining module 494. The beam direction determining module 494 provides beam direction feedback 496 to the phase difference adjustment module 454. The source tracker 490 receives the estimate of the phase difference error 461 from the phase difference error calculator 460 and the output signal 464 from the downmixer 462. The downmixer 462 also receives the beam direction feedback 496 and the estimate of the phase difference error 461 from the phase difference error calculator 460.

Figure 5:
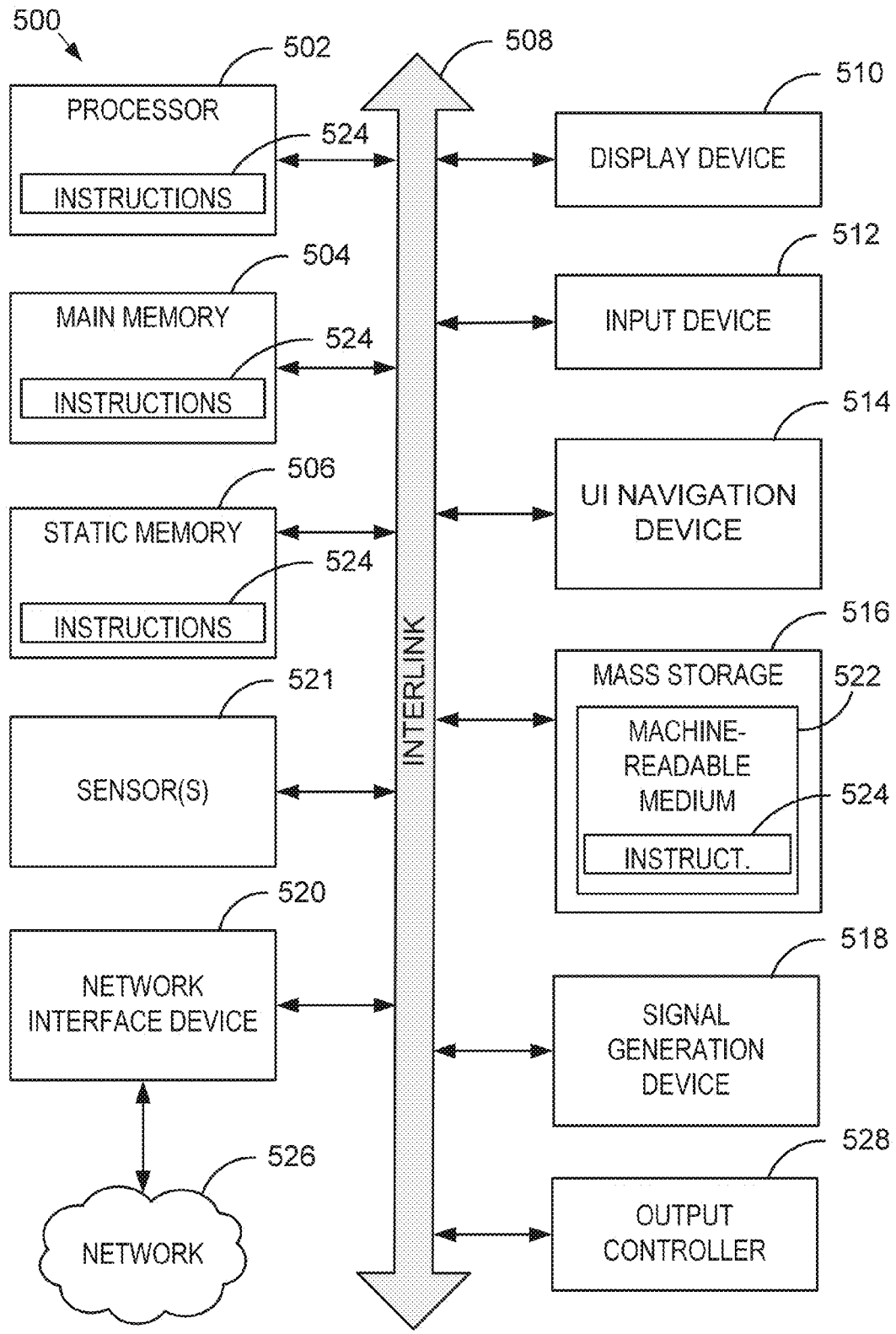
FIG. 5 illustrates a block diagram of an example machine for adapting a phase difference-based noise reduction system according to an embodiment.

FIG. 5 illustrates a block diagram of an example machine 500 for adapting a phase difference-based noise reduction system according to an embodiment upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine and/or a client machine in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 502 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 502 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 500 may include a hardware processor 502 (e.g., a central processing unit (CPU), a graphics processing unit (GPU), a hardware processor core, or any combination thereof), a main memory 504 and a static memory 506, at least some of which may communicate with others via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The storage device 516 may include at least one machine readable medium 522 on which is stored one or more sets of data structures or instructions 524 (e.g., software) embodying or utilized by any one or more of the techniques or functions described herein. The instructions 524 may also reside, at least partially, additional machine readable memories such as main memory 504, static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) that configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Embodiments of noise reduction algorithms for automatic speech recognition (ASR) systems combine phase-difference based methods with continuous estimation of the SNR to adapt a noise reduction filter to the current acoustic conditions. A frequency-dependent scaling of the phase differences and a single-channel spectral subtraction may also be used to improve embodiments of noise reduction algorithms for ASR. Accordingly, the embodiments lead to lower speech recognition error rates with measured relative improvements in word error rate of speech recognizers as compared to previous noise reduction methods. The improvements provided by the embodiments may be obtained over a number of diffuse and directional noise conditions, e.g., car noise, cocktail-party noise, second person talking from the side, music playing from the side.

Additional Notes & Examples:

Example 1 may include subject matter (such as a device, apparatus, client or system) for a first channel for receiving a first audio signal a first microphone;
- a second channel for receiving a second audio signal a second microphone, the first and second audio signals including a target audio inside a beam and noise from outside the beam;
- a processor, coupled to the first and second channel, the processor arranged to determine spatial information associated with the first audio signal and with the second audio signal, to adjust phase differences by applying an adjustment for a phase difference greater than π equal to −2π+the phase difference greater than π and applying an adjustment for a phase difference less than −π equal to 2π+the phase difference less than −π, to estimate a signal-to-noise ratio (SNR) on a single-channel signal derived from the first and second audio signals using the determined spatial information, to adapt a mapping of the adjusted phase differences to gain factors for determination of frequency dependent attenuation factors for attenuating frequency bins associated with noise outside the beam and to apply the frequency dependent attenuation factors to attenuate frequency bins outside the beam to produce a target signal having noise reduced.

In Example 2 the subject matter of any one or more of Example 1 the adaptive phase difference-based noise reduction system of claim 1, wherein the processor is further arranged to perform spectral subtraction on the single-channel signal derived from the first and second audio signals to remove estimated noise from the single-channel signal based on a weighting that affects frequencies associated with a target signal less.

In Example 3 the subject matter of any one or more of Examples 1-2 may optionally include, wherein the processor performs spectral subtraction on the single-channel signal by subtracting noise from the single channel signal based on the estimated SNR.

In Example 4 the subject matter of any one or more of Examples 1-3 may optionally include, wherein the processor determines spatial information by adjusting the phase difference with a computed offset to allow beam steering In Example 5 the subject matter of any one or more of Examples 1-4 may optionally include, wherein the processor adapts the mapping of the adjusted phase differences to gain factors by calculating a phase difference error to be equal to an absolute value of the phase difference divided by a vector with an allowable phase difference and subtracting a beam factor from the calculated phase difference error and clamping negative phase difference error values to zero to prevent frequency bins inside the inner portion of the beam from being attenuated.

In Example 6 the subject matter of any one or more of Examples 1-5 may optionally include, wherein the processor calculates the phase difference error by scaling phase differences to match time differences of arrival between the first audio signal of the first channel and the second audio signal of the second channel for each frequency bin.

In Example 7 the subject matter of any one or more of Examples 1-6 may optionally include, wherein the processor estimates the signal-to-noise ratio (SNR) on the single-channel signal derived from the first and second audio signals using the determined spatial information by estimating a current signal-to-noise-ratio (SNR) based on the calculated phase difference error for differentiating frequency bins from inside the beam from frequency bins outside the beam, and the single-channel signal.

In Example 8 the subject matter of any one or more of Examples 1-7 may optionally include, wherein the processor is further arranged to downmix the first and second audio signals of the first and second channels to derive the single-channel signal.

In Example 9 the subject matter of any one or more of Examples 1-8 may optionally include, wherein the processor is further arranged to use beamforming to derive the single-channel signal.

In Example 10 the subject matter of any one or more of Examples 1-9 may optionally include, wherein the processor estimates the SNR by computing a ratio of noise energy outside of the beam and speech energy inside the beam.

In Example 11 the subject matter of any one or more of Examples 1-10 may optionally include, wherein the processor computes the ratio of noise energy outside of the beam and speech energy inside the beam by determining magnitudes of frequencies outside of the beam when a phase difference error is determined to be greater than zero, calculating a weighted time average of the magnitudes of frequencies outside of the beam, determining magnitudes of frequencies inside of the beam, estimating an instantaneous signal energy inside the beam and calculating a weighted time average of the estimation of the instantaneous signal energy inside the beam.

In Example 12 the subject matter of any one or more of Examples 1-11 may optionally include, wherein the processor adapts the mapping of phase differences to gain factors for determination of attenuation factors by computing attenuation factors based on a predetermined parameter, the estimated SNR and a calculated phase difference error for each of the frequency bins.

In Example 13 the subject matter of any one or more of Examples 1-12 may optionally include, wherein the processor is further arranged to calculate phase difference errors between more than two channels and combining attenuation factors obtained for each channel pairwherein the processor estimates the signal-to-noise ratio (SNR) on the single-channel signal derived from the first and second audio signals using the determined spatial information by estimating a current signal-to-noise-ratio (SNR) based on the calculated phase difference error for differentiating frequency bins from inside the beam from frequency bins outside the beam, and the single-channel signal.

In Example 14 the subject matter of any one or more of Examples 1-13 may optionally include, wherein the processor derives the single-channel signal by processing more than two input audio signals of more than two channels to generate the single-channel signal.

Example 15 includes subject matter (such as a method or means for performing acts) including determining spatial information associated with a first audio signal received in a first channel from a first microphone and with a second audio signal received in a second channel from a second microphone, the first and second audio signals including a target audio inside a beam and noise from outside the beam;
  adjusting phase differences by applying an adjustment for a phase difference greater than π equal to −2π+the phase difference greater than π and applying an adjustment for a phase difference less than −π equal to 2π+the phase difference less than −π;
  estimating a signal-to-noise ratio (SNR) on a single-channel signal derived from the first and second audio signals using the determined spatial information;
  adapting a mapping of the adjusted phase differences to gain factors for determination of frequency dependent attenuation factors for attenuating frequency bins associated with noise outside the beam; and
  applying the frequency dependent attenuation factors to attenuate frequency bins outside the beam to produce a target signal having noise reduced.

In Example 16 the subject matter of any one or more of Example 15 may optionally include, further comprises performing spectral subtraction on a single-channel signal derived from the first and second audio signals to remove estimated noise from the single-channel signal based on a weighting that affects frequencies associated with a target signal less, wherein the performing spectral subtraction on a single-channel signal further comprises subtracting noise from the single channel signal based on the estimated SNR.

In Example 17 the subject matter of any one or more of Example 15 or 16 may optionally include, wherein the determining spatial information further comprises adjusting the phase difference with a computed offset to allow beam steering and wherein the adapting the mapping from the phase differences to gain factors further comprises calculating a phase difference error to be equal to an absolute value of the phase difference divided by a vector with an allowable phase difference and subtracting a beam factor from the calculated phase difference error and clamping negative phase difference error values to zero to prevent frequency bins inside the inner portion of the beam from being attenuated.

In Example 18 the subject matter of any one or more of Examples 15-17 may optionally include, wherein the determining the phase difference error further comprises scaling phase differences to match time differences of arrival between the first audio signal of the first channel and the second audio signal of the second channel for each frequency bin and wherein the estimating the signal-to-noise ratio (SNR) on the single-channel signal derived from the first and second audio signals using the determined spatial information further comprises estimating a current signal-to-noise-ratio (SNR) based on a phase difference error for differentiating frequency bins from inside the beam from frequency bins outside the beam, and the single-channel signal.

In Example 19 the subject matter of any one or more of Examples 15-18 may optionally include, further comprising downmixing the first and second audio signals of the first and second channels to generate the single-channel signal.

In Example 20 the subject matter of any one or more of Examples 15-19, further comprising using beamforming to generate the single-channel signal.

In Example 21 the subject matter of any one or more of Examples 15-20 may optionally include, wherein estimating the SNR further comprises computing a ratio of noise energy outside of the beam and speech energy inside the beam.

In Example 22 the subject matter of any one or more of Examples 15-21 may optionally include, determining magnitudes of frequencies outside of the beam when a phase difference error is determined to be greater than zero;
  calculating a weighted time average of the magnitudes of frequencies outside of the beam;
  determining magnitudes of frequencies inside of the beam;
  estimating an instantaneous signal energy inside the beam; and
  calculating a weighted time average of the estimation of the instantaneous signal energy inside the beam.

In Example 23 the subject matter of any one or more of Examples 15-22 may optionally include, further comprising calculating phase difference errors between more than two channels and combining attenuation factors obtained for each channel pair, wherein the adapting a mapping of phase differences to gain factors for determination of attenuation factors further comprises computing attenuation factors based on a predetermined parameter, the estimated SNR and the calculated phase difference error for each of the frequency bins.

In Example 24 the subject matter of any one or more of Examples 15-23 may optionally include, further comprising generating the single-channel signal by processing more than two input audio signals of more than two channels to generate the single-channel signal.

Example 25 may include subject matter (such as means for performing acts or machine readable medium including instructions that, when executed by the machine, cause the machine to perform acts) including determining spatial information associated with a first audio signal received in a first channel from a first microphone and with a second audio signal received in a second channel from a second microphone, the first and second audio signals including a target audio inside a beam and noise from outside the beam;
  adjusting phase differences by applying an adjustment for a phase difference greater than π equal to −2π+the phase difference greater than π and applying an adjustment for a phase difference less than −π equal to 2π+the phase difference less than −π;
  estimating a signal-to-noise ratio (SNR) on a single-channel signal derived from the first and second audio signals using the determined spatial information;
  adapting a mapping of the adjusted phase differences to gain factors for determination of frequency dependent attenuation factors for attenuating frequency bins associated with noise outside the beam; and
  applying the frequency dependent attenuation factors to attenuate frequency bins outside the beam to produce a target signal having noise reduced.

In Example 26 the subject matter of any one or more of Example 25 may optionally include, further comprises performing spectral subtraction on a single-channel signal derived from the first and second audio signals to remove estimated noise from the single-channel signal based on a weighting that affects frequencies associated with a target signal less, wherein the performing spectral subtraction on a single-channel signal further comprises subtracting noise from the single channel signal based on the estimated SNR.

In Example 27 the subject matter of any one or more of Example 25 or 26 may optionally include, wherein the determining spatial information further comprises adjusting the phase difference with a computed offset to allow beam steering and wherein the adapting the mapping from the phase differences to gain factors further comprises calculating a phase difference error to be equal to an absolute value of the phase difference divided by a vector with an allowable phase difference and subtracting a beam factor from the calculated phase difference error and clamping negative phase difference error values to zero to prevent frequency bins inside the inner portion of the beam from being attenuated.

In Example 28 the subject matter of any one or more of Examples 25-27 may optionally include, wherein the determining the phase difference error further comprises scaling phase differences to match time differences of arrival between the first audio signal of the first channel and the second audio signal of the second channel for each frequency bin and wherein the estimating the signal-to-noise ratio (SNR) on the single-channel signal derived from the first and second audio signals using the determined spatial information further comprises estimating a current signal-to-noise-ratio (SNR) based on a phase difference error for differentiating frequency bins from inside the beam from frequency bins outside the beam, and the single-channel signal.

In Example 29 the subject matter of any one or more of Examples 25-28 may optionally include, further comprising downmixing the first and second audio signals of the first and second channels to generate the single-channel signal.

In Example 30 the subject matter of any one or more of Examples 25-29 may optionally include, further comprising using beamforming to generate the single-channel signal.

In Example 31 the subject matter of any one or more of Examples 25-30 may optionally include, wherein estimating the SNR further comprises computing a ratio of noise energy outside of the beam and speech energy inside the beam.

In Example 32 the subject matter of any one or more of Examples 25-31 may optionally include, determining magnitudes of frequencies outside of the beam when a phase difference error is determined to be greater than zero;
  calculating a weighted time average of the magnitudes of frequencies outside of the beam;
  determining magnitudes of frequencies inside of the beam;
  estimating an instantaneous signal energy inside the beam; and
  calculating a weighted time average of the estimation of the instantaneous signal energy inside the beam.

In Example 33 the subject matter of any one or more of Examples 25-32 may optionally include, further comprising calculating phase difference errors between more than two channels and combining attenuation factors obtained for each channel pair, wherein the adapting a mapping of phase differences to gain factors for determination of attenuation factors further comprises computing attenuation factors based on a predetermined parameter, the estimated SNR and the calculated phase difference error for each of the frequency bins.

In Example 34 the subject matter of any one or more of Examples 25-33 may optionally include, further comprising generating the single-channel signal by processing more than two input audio signals of more than two channels to generate the single-channel signal.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An adaptive phase difference-based noise reduction system, comprising:
  a first channel for receiving a first audio signal at a first microphone;
  a second channel for receiving a second audio signal at a second microphone, the first and second audio signals including a target audio inside a beam and noise from outside the beam;
  a processor, coupled to the first and second channel, the processor arranged to:

determine spatial information associated with the first audio signal and with the second audio signal;

adjust phase differences by applying an adjustment for a phase difference greater than π equal to −2π+ the phase difference greater than π and applying an adjustment for a phase difference less than −π equal to 2π+the phase difference less than −π; to estimate a signal-to-noise ratio (SNR) on a single-channel signal derived from the first and second audio signals using the determined spatial information;

adapt a mapping of the adjusted phase differences to gain factors for determination of frequency dependent attenuation factors for attenuating frequency bins associated with noise outside the beam, wherein to adapt the mapping of the adjusted phase differences to gain factors includes:

calculating phase difference errors for the frequency bins to be respectively equal to an absolute value of a phase difference divided by a phase-threshold vector component and subtracting a beam factor, components of a phrase-threshold vector corresponding to the frequency bins; and clamping negative phase difference error values to zero to prevent frequency bins inside an inner portion of the beam from being attenuated; and apply the frequency dependent attenuation factors to attenuate frequency bins outside the beam to produce a target signal having noise reduced.

2. The adaptive phase difference-based noise reduction system of claim 1, wherein the processor is further arranged to perform spectral subtraction on the single-channel signal derived from the first and second audio signals to remove estimated noise from the single-channel signal based on one selected from a group consisting of a weighting that affects frequencies associated with a target signal less and the estimated SNR.

3. The adaptive phase difference-based noise reduction system of claim 1, wherein the processor determines spatial information by adjusting the phase difference with a computed offset to allow beam steering.

4. The adaptive phase difference-based noise reduction system of claim 1, wherein the processor calculates the phase difference error by scaling phase differences to match time differences of arrival between the first audio signal of the first channel and the second audio signal of the second channel for each frequency bin.

5. The adaptive phase difference-based noise reduction system of claim 1, wherein the processor estimates the signal-to-noise ratio (SNR) on the single-channel signal derived from the first and second audio signals using the determined spatial information by estimating a current signal-to-noise-ratio (SNR) based on the calculated phase difference error for differentiating frequency bins from inside the beam from frequency bins outside the beam, and the single-channel signal.

6. The adaptive phase difference-based noise reduction system of claim 1, wherein the processor is further arranged to downmix the first and second audio signals of the first and second channels to derive the single-channel signal and to estimates the SNR by computing a ratio of noise energy outside of the beam and speech energy inside the beam.

7. The adaptive phase difference-based noise reduction system of claim 6, wherein the processor computes the ratio of noise energy outside of the beam and speech energy inside the beam by determining magnitudes of frequencies outside of the beam when a phase difference error is determined to be greater than zero, calculating a weighted time average of the magnitudes of frequencies outside of the beam, determining magnitudes of frequencies inside of the beam, estimating an instantaneous signal energy inside the beam and calculating a weighted time average of the estimation of the instantaneous signal energy inside the beam.

8. The adaptive phase difference-based noise reduction system of claim 1, wherein the processor adapts the mapping of phase differences to gain factors for determination of attenuation factors by computing attenuation factors based on a predetermined parameter, the estimated SNR and a calculated phase difference error for each of the frequency bins.

9. The adaptive phase difference-based noise reduction system of claim 1, wherein the processor is further arranged to calculate phase difference errors between more than two channels and combining attenuation factors obtained for each channel pair.

10. The adaptive phase difference-based noise reduction system of claim 1, wherein the processor derives the single-channel signal by processing more than two input audio signals of more than two channels to generate the single-channel signal.

11. A method for adapting a phase difference-based noise reduction system, comprising determining spatial information associated with a first audio signal received in a first channel from a first microphone and with a second audio signal received in a second channel from a second microphone, the first and second audio signals including a target audio inside a beam and noise from outside the beam;

adjusting phase differences by applying an adjustment for a phase difference greater than π equal to −2π+ the phase difference greater than π and applying an adjustment for a phase difference less than π equal to 2π+ the phase difference less than −π;

estimating a signal-to-noise ratio (SNR) on a single-channel signal derived from the first and second audio signals using the determined spatial information;

adapting a mapping of the adjusted phase differences to gain factors for determination of frequency dependent attenuation factors for attenuating frequency bins associated with noise outside the beam, wherein adapting the mapping from the phase differences to gain factors includes:

calculating phase difference errors for the frequency bins to be respectively equal to an absolute value of a phase difference divided by a phase-threshold vector component and subtracting a beam factor, components of a phase-threshold vector corresponding to the frequency bins; and clamping negative phase difference error values to zero to prevent frequency bins inside an inner portion of the beam from being attenuated; and applying the frequency dependent attenuation factors to attenuate frequency bins outside the beam to produce a target signal having noise reduced.

12. The method of claim 11 further comprises performing spectral subtraction on a single-channel signal derived from the first and second audio signals to remove estimated noise from the single-channel signal based on a weighting that affects frequencies associated with a target signal less, wherein the performing spectral subtraction on a single-channel signal further comprises subtracting noise from the single channel signal based on the estimated SNR.

13. The method of claim 11, wherein the determining spatial information further comprises adjusting the phase difference with a computed offset to allow beam steering.

14. The method of claim 11, wherein the determining the phase difference errors further comprises scaling phase differences to match time differences of arrival between the first audio signal of the first channel and the second audio signal of the second channel for each frequency bin and wherein the estimating the signal-to-noise ratio (SNR) on the single-channel signal derived from the first and second audio signals using the determined spatial information further comprises estimating a current signal-to-noise-ratio (SNR) based on a phase difference error for differentiating frequency bins from inside the beam from frequency bins outside the beam, and the single-channel signal.

15. The method of claim 11 further comprising downmixing the first and second audio signals of the first and second channels to generate the single-channel signal.

16. The method of claim 11 further comprising using beamforming to generate the single-channel signal.

17. The method of claim 11, wherein estimating the SNR further comprises computing a ratio of noise energy outside of the beam and speech energy inside the beam.

18. The method of claim 17, wherein the computing the ratio of noise energy outside of the beam and speech energy inside the beam further comprises:
determining magnitudes of frequencies outside of the beam when a phase difference error is determined to be greater than zero;
calculating a weighted time average of the magnitudes of frequencies outside of the beam;
determining magnitudes of frequencies inside of the beam;
estimating an instantaneous signal energy inside the beam; and
calculating a weighted time average of the estimation of the instantaneous signal energy inside the beam.

19. The method of claim 11 further comprising calculating phase difference errors between more than two channels and combining attenuation factors obtained for each channel pair, wherein the adapting a mapping of phase differences to gain factors for determination of attenuation factors further comprises computing attenuation factors based on a predetermined parameter, the estimated SNR and the calculated phase difference error for each of the frequency bins.

20. The method of claim 11, further comprising generating the single-channel signal by processing more than two input audio signals of more than two channels to generate the single-channel signal.

21. At least one non-transitory machine readable medium comprising instructions that, when executed by the machine, cause the machine to perform operations for adapting a phase difference-based noise reduction system, the operations comprising:
determining spatial information associated with a first audio signal received in a first channel from a first microphone and with a second audio signal received in a second channel from a second microphone, the first and second audio signals including a target audio inside a beam and noise from outside the beam;
adjusting phase differences by applying an adjustment for a phase difference greater than $\pi$ equal to $-2\pi+$ the phase difference greater than $\pi$ and applying an adjustment for a phase difference less than $\pi$ equal to $2\pi+$ the phase difference less than $-\pi$;
estimating a signal-to-noise ratio (SNR) on a single-channel signal derived from the first and second audio signals using the determined spatial information;
adapting a mapping of the adjusted phase differences to gain factors for determination of frequency dependent attenuation factors for attenuating frequency bins associated with noise outside the beam, wherein adapting the mapping from the phase differences to gain factors includes:
calculating phase difference errors for the frequency bins to be respectively equal to an absolute value of a phase difference divided by a phase-threshold vector component and subtracting a beam factor, components of a phase-threshold vector corresponding to the frequency bins; and
clamping negative phase difference error values to zero to prevent frequency bins inside an inner portion of the beam from being attenuated; and
applying the frequency dependent attenuation factors to attenuate frequency bins outside the beam to produce a target signal having noise reduced.

22. The at least one non-transitory machine readable medium of claim 21 further comprises calculating phase difference errors between more than two channels and combining attenuation factors obtained for each channel pair and performing spectral subtraction on a single-channel signal derived from the first and second audio signals to remove estimated noise from the single-channel signal based on a weighting that affects frequencies associated with a target signal less, wherein the performing spectral subtraction on a single-channel signal further comprises subtracting noise from the single channel signal based on the estimated SNR and wherein the adapting a mapping of phase differences to gain factors for determination of attenuation factors further comprises computing attenuation factors based on a predetermined parameter, the estimated SNR and the calculated phase difference error for each of the frequency bins.

23. The at least one non-transitory machine readable medium of claim 21, wherein the determining spatial information further comprises adjusting the phase difference with a computed offset to allow beam steering.

24. The at least one non-transitory machine readable medium of claim 21, wherein the determining the phase difference errors further comprises scaling phase differences to match time differences of arrival between the first audio signal of the first channel and the second audio signal of the second channel for each frequency bin and wherein the estimating the signal-to-noise ratio (SNR) on the single-channel signal derived from the first and second audio signals using the determined spatial information further comprises estimating a current signal-to-noise-ratio (SNR) based on a phase difference error for differentiating frequency bins from inside the beam from frequency bins outside the beam, and the single-channel signal.

* * * * *

UNITED STATES PATENT AND TRADEMARK OFFICE
CERTIFICATE OF CORRECTION

PATENT NO. : 9,449,594 B2
APPLICATION NO. : 14/124790
DATED : September 20, 2016
INVENTOR(S) : Kurylo et al.

Page 1 of 1

It is certified that error appears in the above-identified patent and that said Letters Patent is hereby corrected as shown below:

On the Title Page

In item (72), in "Inventors", in Column 1, Line 1, after "Gdansk", insert --, PM--, therefor In item (72), in "Inventors", in Column 1, Line 2, after "München", insert --, BY--, therefor In the Claims In Column 15, Line 7, in Claim 1, delete "$2\pi$+the" and insert --$2\pi$+ the--, therefor In Column 15, Line 7, in Claim 1, after "-$\pi$;", delete "to", therefor In Column 15, Line 22, in Claim 1, delete "phrase-threshold" and insert --phase-threshold--, therefor In Column 16, Line 37, in Claim 11, delete "than $\pi$" and insert --than -$\pi$--, therefor In Column 18, Line 4, in Claim 21, delete "than $\pi$" and insert --than -$\pi$--, therefor Signed and Sealed this
Twentieth Day of March, 2018

Andrei Iancu
*Director of the United States Patent and Trademark Office*